US011763223B1

(12) United States Patent
Gupta et al.

(10) Patent No.: US 11,763,223 B1
(45) Date of Patent: Sep. 19, 2023

(54) SYSTEM FOR GENERATING AND MAINTAINING A RESOURCE DEPLOYMENT MAP OVER A COMMUNICATIONS NETWORK

(71) Applicant: REALIZATION TECHNOLOGIES, INC, Sunnyvale, CA (US)

(72) Inventors: Sanjeev Gupta, Sunnyvale, CA (US); Ravi Shankar, Sunnyvale, CA (US)

(73) Assignee: REALIZATION TECHNOLOGIES, INC, Sunnyvale, CA (US)

( * ) Notice: Subject to any disclaimer, the term of this patent is extended or adjusted under 35 U.S.C. 154(b) by 0 days.

(21) Appl. No.: 17/747,155

(22) Filed: May 18, 2022

(51) Int. Cl.
G06Q 10/06 (2023.01)
G06Q 10/0631 (2023.01)

(52) U.S. Cl.
CPC .............................. *G06Q 10/06313* (2013.01)

(58) Field of Classification Search
CPC ...................................................... G06Q 10/06
See application file for complete search history.

(56) References Cited

U.S. PATENT DOCUMENTS

| | | | |
|---|---|---|---|
| 6,101,481 A | 8/2000 | Miller | |
| 7,614,040 B2 * | 11/2009 | Wagner | G06F 8/71 717/121 |
| 7,788,120 B2 | 8/2010 | Mathias | |
| 7,941,445 B2 | 5/2011 | Motoyama | |
| 7,970,639 B2 | 6/2011 | Vucina | |
| 8,055,606 B2 | 11/2011 | Kreamer | |
| 8,160,911 B2 | 4/2012 | Lau | |
| 8,571,906 B2 | 10/2013 | Upadhyaya | |
| 8,990,810 B2 * | 3/2015 | Bobak | G06Q 10/06 718/100 |

(Continued)

FOREIGN PATENT DOCUMENTS

| | | | |
|---|---|---|---|
| KR | 102184182 B1 | 11/2020 | |
| WO | WO-2015113203 A1 * | 8/2015 | ............ B25J 9/1671 |

OTHER PUBLICATIONS

Mendoza, Charles E., Resource planning and resource allocation in the construction industry, Calhoun: The NPS Institutional Archive, 1995. (Year: 1995).*

(Continued)

*Primary Examiner* — Kurtis Gills
(74) *Attorney, Agent, or Firm* — Mark Terry

(57) ABSTRACT

A system, method and computer readable medium for generating and maintaining a resource deployment map for a project over a communications network includes a database for storing the resource deployment map including a set of tasks, dependencies between tasks, a predefined period of time required for completing each task, a set of resources, and assignments of the set of resources to the tasks, a web server for receiving project change information including a modified set of resources, and time delays in the tasks, identifying integration points in the resource deployment map, wherein an integration point comprises tasks, assigning the modified set of resources to the tasks as follows: assign all resources necessary for a first integration point, assign all remaining resources necessary for a next integration point, repeat the previous step until all resources are assigned, and generating a revised resource deployment map based on the modified set of resources, and time delays.

17 Claims, 10 Drawing Sheets

(56) References Cited

U.S. PATENT DOCUMENTS

| | | | |
|---|---|---|---|
| 9,002,900 | B2 | 4/2015 | Feinsmith |
| 11,087,281 | B2 | 8/2021 | Ching |
| 2004/0059622 | A1 | 3/2004 | Mueller |
| 2005/0278210 | A1 | 12/2005 | Roberts |
| 2007/0143169 | A1 | 6/2007 | Grant et al. |
| 2009/0171704 | A1* | 7/2009 | Bobak .................... G06Q 10/06 705/1.1 |
| 2013/0231971 | A1 | 9/2013 | Bishop |
| 2016/0350700 | A1 | 12/2016 | Leary |
| 2018/0101805 | A1 | 4/2018 | Park |
| 2018/0348742 | A1* | 12/2018 | Byrne .............. G05B 19/41865 |
| 2019/0220828 | A1 | 7/2019 | Murali |
| 2020/0019907 | A1* | 1/2020 | Notani ........... G06Q 10/063116 |
| 2020/0027064 | A1 | 1/2020 | Mishra |
| 2020/0210963 | A1 | 7/2020 | Parash |
| 2020/0242524 | A1* | 7/2020 | Soundararajan ............................. G06Q 10/06375 |
| 2021/0142249 | A1* | 5/2021 | Ellsworth ........ G06Q 10/06315 |
| 2021/0319389 | A1* | 10/2021 | Jafari ................. G06Q 10/1097 |
| 2021/0399911 | A1* | 12/2021 | Jorasch ................. H04L 65/403 |

OTHER PUBLICATIONS

E-Builder Project Management Software: https://www.ebuilder.net/help/Production/Content/PDFs/e-Builder-Schedule.pdf.
Microsoft Project Scheduling & Tasks: https://support.microsoft.com/en-us/office/how-projectschedules-tasks-behind-the-scenes-df3431ab-8d8a-4047-afc6-a87b547dbac0.
How to Plan and Manage Your Project Schedule with SharePoint: https://www.brightwork.com/blog/project-schedule-sharepoint.

* cited by examiner

SYSTEM FOR GENERATING AND MAINTAINING A RESOURCE DEPLOYMENT MAP OVER A COMMUNICATIONS NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of project management and, more specifically, the claimed subject matter relates to the field of project planning, project resource deployment map maintenance and replanning.

BACKGROUND

In recent years, project management software has gained increasing popularity. Billions of U.S. dollars are spent on project management software every year. However, it is still the case that most projects, regardless of industry or type, are delivered late, over budget and under scope. For example, most projects in construction are late and over budget, most engineering projects in the semiconductor industry finish late, most high-tech projects are late despite the use of project management software and traditional tools, most embedded systems are delivered late, and most defense projects take too long and cost too much. One of the causes for the inability to attain certain goals in project management involves the inadequacies of planning techniques that allow for efficient allocation of limited capacity to various tasks in projects, especially in the face of changes and day-to-day delays.

Currently, a popular tool in project management is the generation and maintenance of a project plan. Typically, tasks, activities, milestones, resource requirements, and products are detailed and documented in a project plan. In brief, a project plan captures all the detailed activities of a project in a sequence from the beginning until the end of the project, and said plan must be managed in order to realize established time and budget goals. This approach, however, is associated with a number of drawbacks.

One of the drawbacks associated with conventional project management software involves maintaining a project plan after a project has started. In large or complicated projects, the resulting project plan can become quite complex when considering large numbers of milestones, tasks and dependencies between those tasks. Consequently, once a project has started, it can be complicated, time-consuming and tedious to edit or modify a project plan to account for changes that have occurred, such as a change in scope, dependencies, resources, or time constraints. As a result, project plans can become out of date and inaccurate.

A well-known drawback associated with conventional project management software involves maintaining a project plan in the face of delays and resource limitations. In an ideal world, where there are no delays and resources are unlimited, creating a project plan and sticking to that plan is trivial. But in the real world, delays change the amount of time necessary to complete certain tasks and resource limitations restrict the number and scope of tasks that can be completed at any one time. When delays and resource limitations arise, a project plan must be adjusted accordingly, but in large or complicated projects, the number of ways in which the project plan can be adjusted in the face of said delays and resource limitations becomes so complex that it becomes an NP-complete problem, which is a class of computational problems for which no efficient solution algorithm exists. Consequently, when delays and resource limitations arise, project plans are adjusted in ways that are not the most efficient. As a result, delays and resource limitations effect project timelines and budgets in negative ways.

One solution to the problem of controlling the sequence in which tasks are scheduled, using conventional project management software, involves schedulers manually specifying or imposing many constraints for the detailed tasks. But this solution is impractical because such project plans cannot be kept current and those constraints must be redone when project plans change, which is time-consuming and costly. An alternative solution is to just have high level summary tasks in the plan. But this solution is of limited utility because i) it cannot provide schedules at the level of detail at which projects are executed, and ii) it cannot be updated directly by people performing those tasks. Yet another alternative solution is to maintain multiple project plans, one for high level summary tasks and then one plan per summary task that contains execution details for the corresponding summary task. This solution is also impractical because it requires continual interpretation of results from summary tasks and manual inputs into detailed execution tasks, and vice versa.

Therefore, what is needed is a system and method for improving the problems with the prior art, and more particularly for a more expedient, accurate and efficient method and system for allocating limited capacity to various tasks in a project, and for facilitating the maintenance of project plans during the course of a project to easily keep them up to-date.

BRIEF SUMMARY

In one embodiment, a system, method and computer readable medium for generating and maintaining a resource deployment map for a project over a communications network is disclosed. The system includes a database communicably connected to the communications network, the database configured for storing the resource deployment map, the resource deployment map including a set of tasks, dependencies between tasks of the set of tasks, a predefined period of time required for completing each task of the set of tasks, a set of resources, and assignments of the set of resources to the set of tasks, a web server communicably connected to the communications network, the web server configured for receiving, via the communications network, project change information including a modified set of resources, and time delays in the predefined periods of time required for completing each task of the set of tasks, identifying one or more integration points in the resource deployment map, wherein an integration point comprises one or more tasks, assigning the modified set of resources to the set of tasks as follows: assign all resources, of the modified set of resources, necessary for completion of a first integration point of the one or more integration points, assign all remaining resources, of the modified set of resources, necessary for completion of a next integration point of the one or more integration points, repeat the previous step until all resources of the modified set of resources are assigned, and generating a revised resource deployment map based on the modified set of resources, and time delays.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

Figure 1:
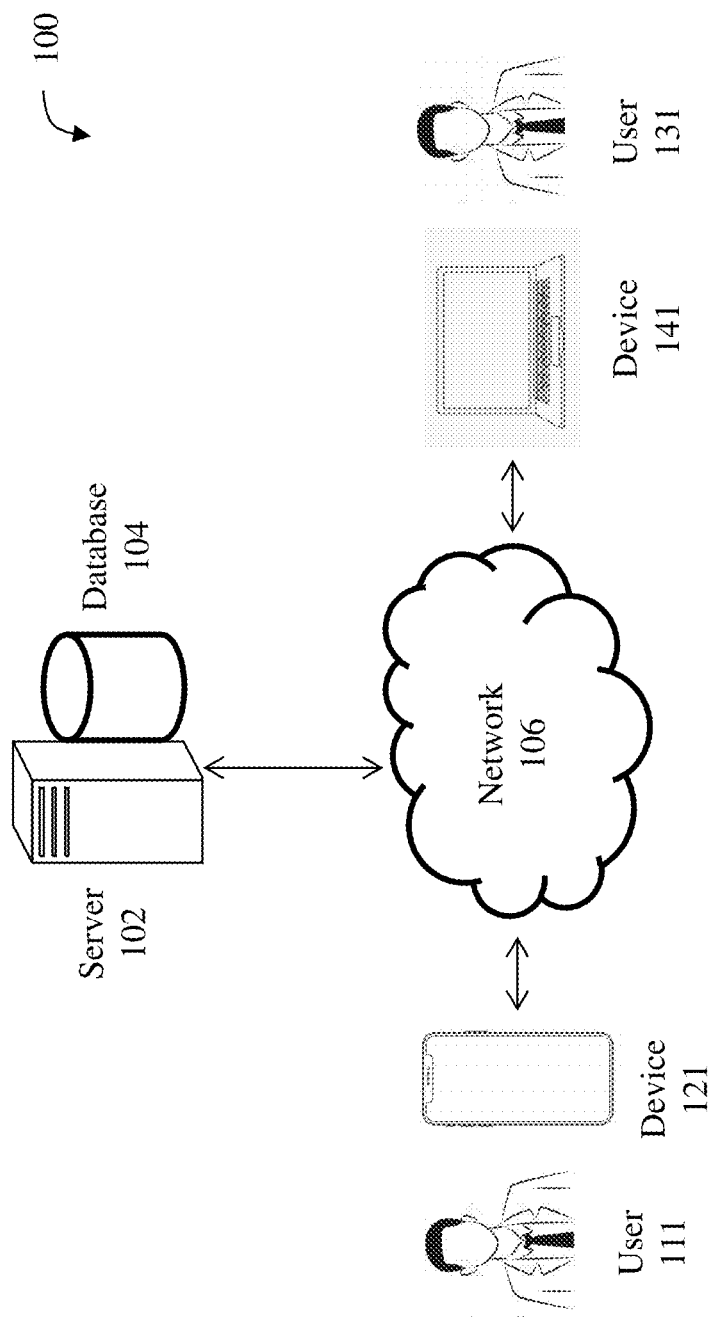
FIG. 1 is a block diagram illustrating the network architecture of a system for generating and maintaining a resource deployment map over a communications network, in accordance with one embodiment.

It should be understood that the embodiments disclosed herein are only examples of the many advantageous uses of the innovative teachings of the claimed embodiments. In general, statements made in the specification of the present application do not necessarily limit any of the various claimed embodiments. Moreover, some statements may apply to some inventive features but not to others. In general, unless otherwise indicated, singular elements may be in the plural and vice versa with no loss of generality. In the drawing like numerals refer to like parts through several views.

The disclosed embodiments improve upon the problems with the prior art by providing a system that leverages the concentration of resources at integration points that results in the quick and easy updating of a resource deployment map after a project has started, in order to account for changes that have occurred, such as a change in resources, time delays or other requirements. The disclosed embodiments further allow for a resource deployment map to be edited in the course of a project accurately and efficiently. This creates project schedules that are highly predictable and organized. Therefore, the disclosed embodiments reduce or eliminate the need for manual scheduling. This is advantageous as it reduces the time and man-hours needed for manual scheduling.

The disclosed embodiments further improve upon the problems with the prior art by providing a system that leverages the concentration of resources at integration points that results in more efficient handling of changes in project specifications, scope or solutions, time delays due to delays in tasks, delays in delivering supplies, delays in obtaining approvals, delays in making decisions, and delays in issue resolution, as well as dealing with resource shortages due to shortages in people, equipment, facilities, materials, expert, managers, and coordinators. The disclosed embodiments further quickly and efficiently handles situations where all tasks for a project are not known in advance, time estimates for tasks are a guest, the availability of resources are not known, the fact that resources are not available as planned, changes in project scope, and standard time delays. The disclosed embodiments further improve upon the problems with the prior art by providing a system that results in shorter project duration, simpler project plans, simpler resource allocation, lower capacity needs, easier management of unplanned shortages, more efficient dealing with time delays, naturally or automatically inserted buffers, the enabling of clear work fronts, the enabling of full kitting, more stable critical paths, more reliable predictions, and a higher likelihood of on time projects.

Figure 2A:
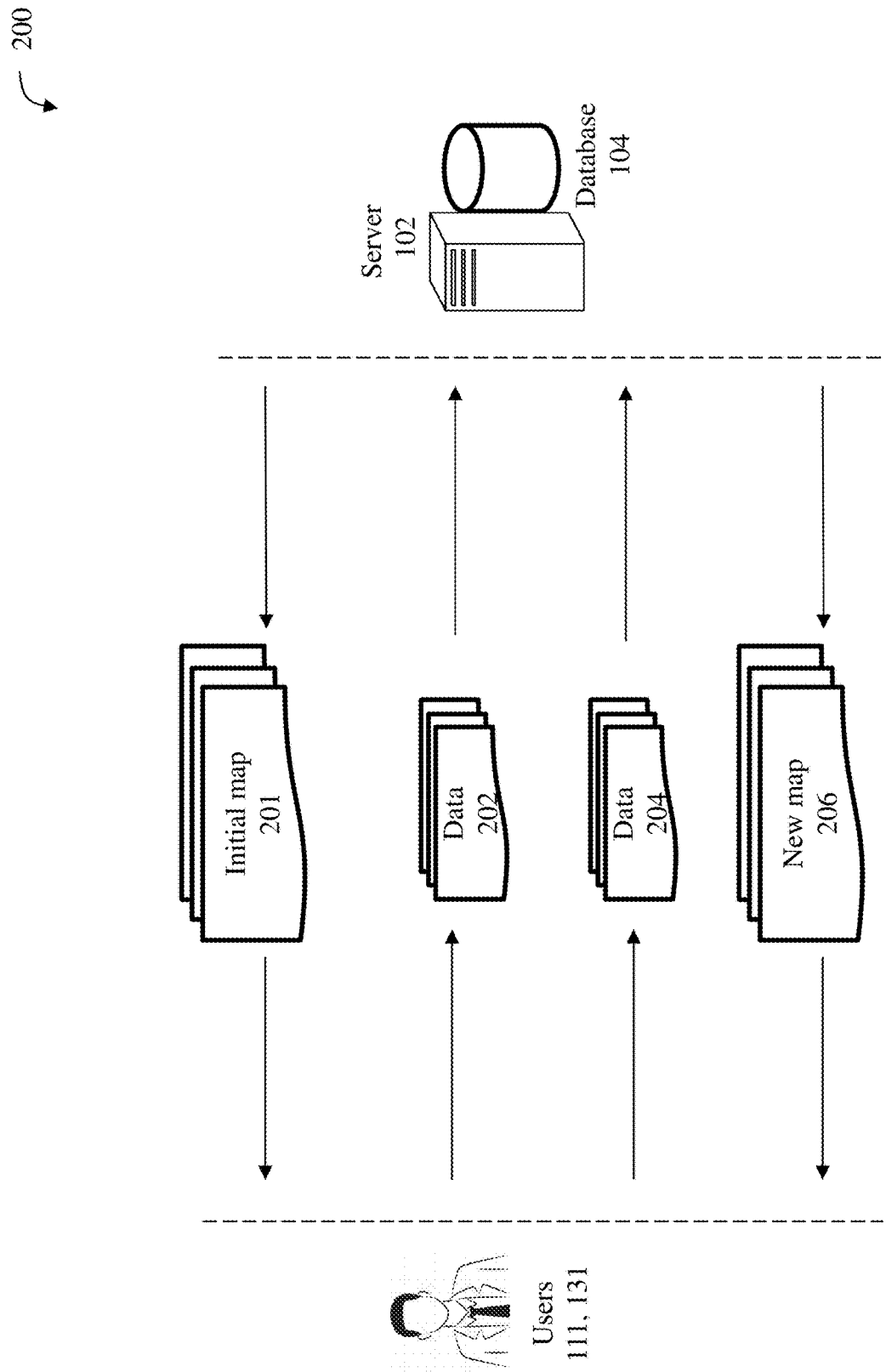
FIG. 2A is a block diagram showing the data flow of the process for generating and maintaining a resource deployment map over a communications network, according to one embodiment.
Figure 2B:
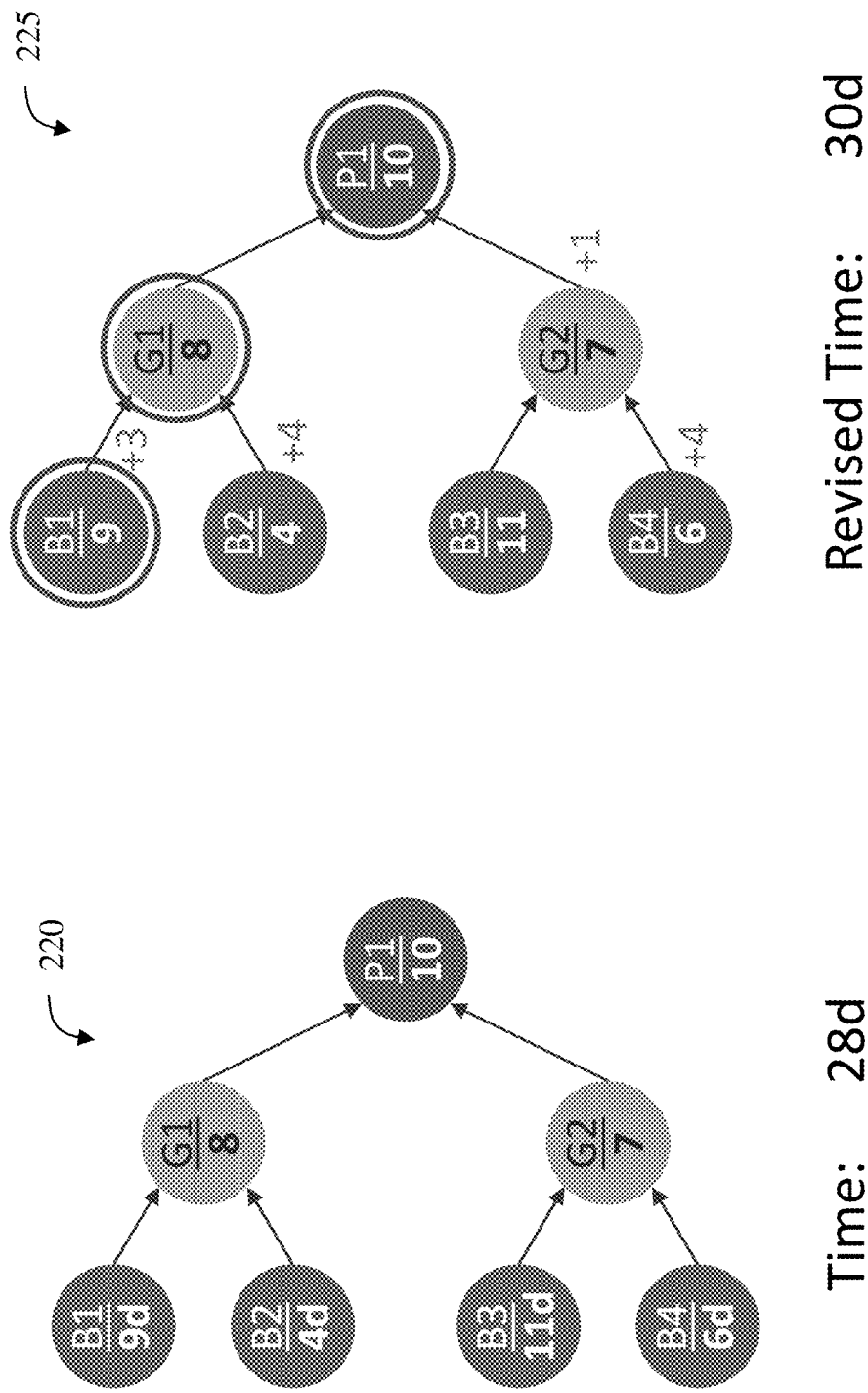
FIG. 2B is a block diagram showing a resource deployment map that has been affected by time delays.
Figure 2C:
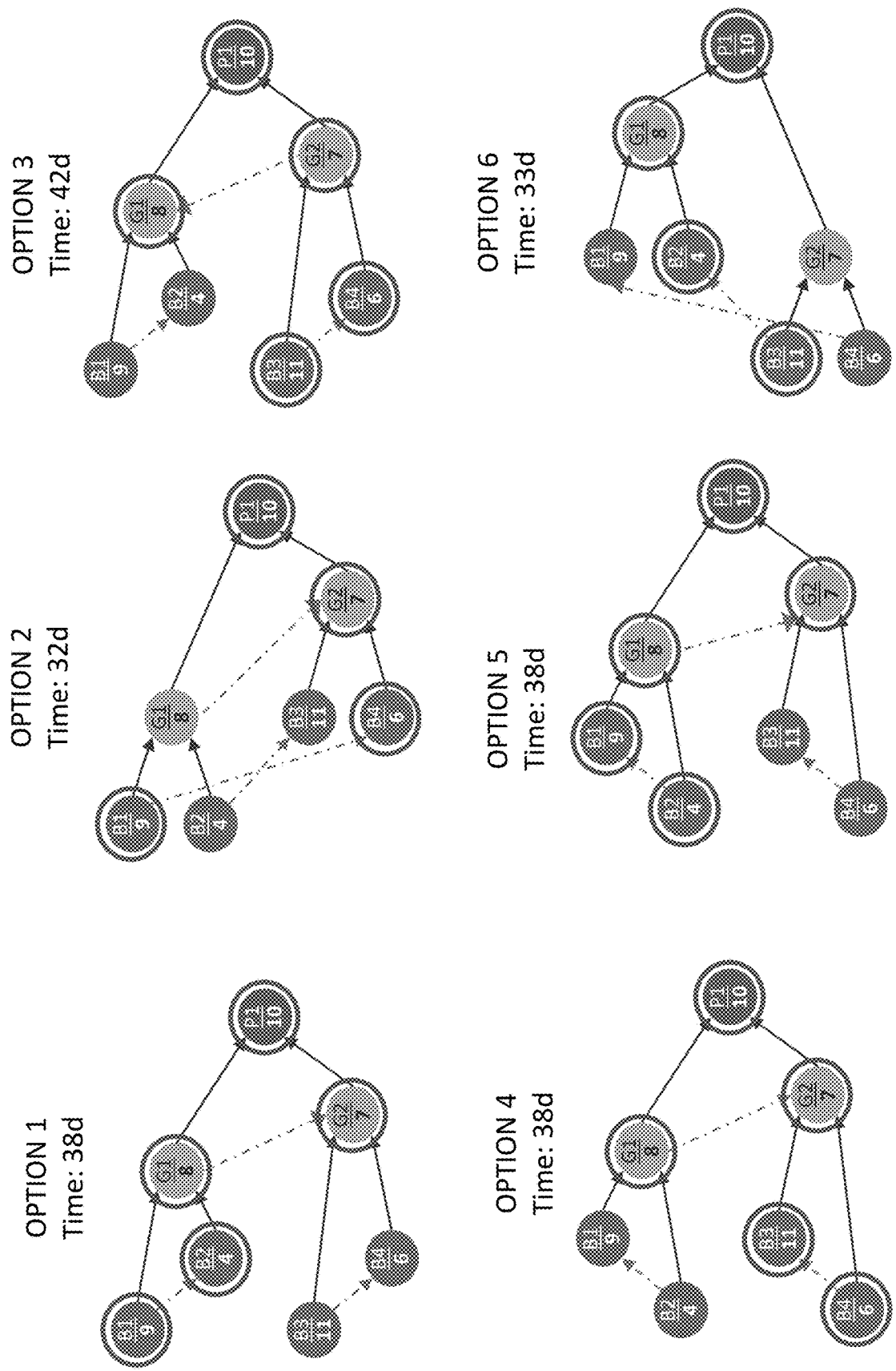
FIG. 2C is a block diagram showing options for modifying a resource deployment map that has been affected by resource constraints.
Figure 2D:
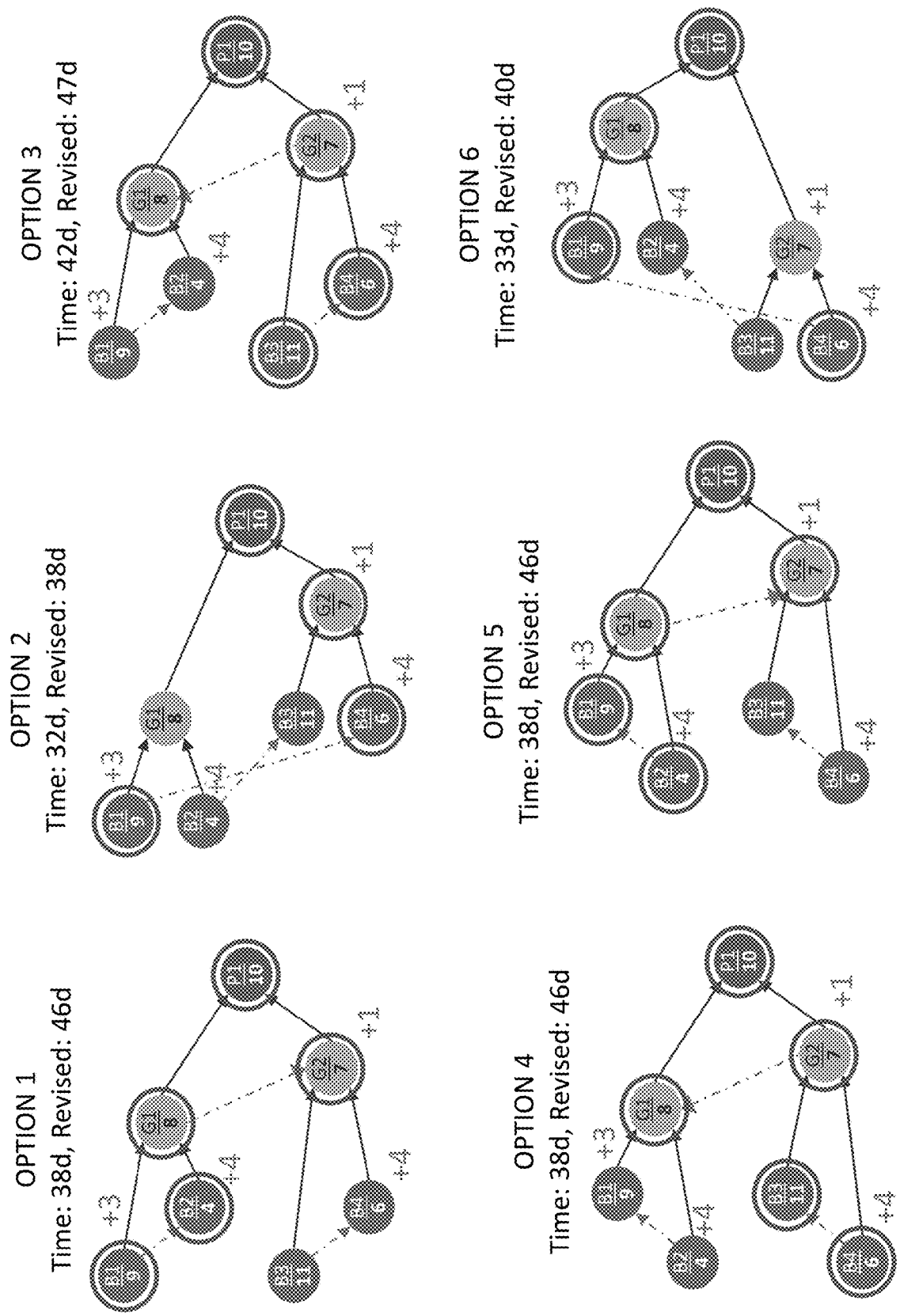
FIG. 2D is a block diagram showing options for modifying a resource deployment map that has been affected by time delays and resource constraints.

Referring now to FIGS. 2B-2D, there is shown an illustration of a block diagram showing current problems with the prior art in project management. There is shown in FIG. 2B a project plan 220 where in each circle represents a task. A task can be one or more actions (such as constructing a building), or one or more physical products (such as the frame of an aircraft), that must be performed or produced by a person or team. Also included in each circle is a unique identifier, such as B1, B2, B3, as well as a number of days required to complete each task, such as 9 days, 4 days, etc. The color of each circle represents the type of resource necessary to complete each task, such as a type of labor, a type of material, a type of product, etc. The figure shows, for example, that tasks B1 and B2 require a blue resource while tasks G1 and G2 require a green resource. The project plan 220 assumes full availability of all resources at the time of completion of each task, and therefore the total completion time for project plan 220 is 28 days total. Note that in FIGS. 2B through 2E, circles B1, B2, B3, B4 are blue, G1 and G2 are green and P1 is purple.

When time delays are experience during project execution, the project plan must be adjusted. There is shown in FIG. 2B a project plan 225 that shows the project plan 220 after it has suffered time delays in certain tasks. Project plan 225 shows, for example, that task B1 has suffered a time delay of 3 days, and task B2 suffered a time delay of 4 days. The project plan p 225 assumes full availability of all resources at the time of completion of each task, and therefore the total completion time for project plan 225 due to time delays is 30 days total.

When there is a constraint on resources during project execution, however, the adjustment of the project plan is much more complicated. In this case, the project plan no longer assumes full availability of all resources at the time of completion of each task. Say, for example, that there are only two blue resources and one green resource available at one time. There is shown in FIG. 2C a plurality of options for adjusting the project plan 220 due to resource constraints. Option 1, for example, shows that the two blue resources are initially assigned to tasks B1 and B2, while the single green resource is initially assigned to task G1. Option 2, for example, shows that the two blue resources are initially assigned to task B1 and to task B4, while the single green resource is assigned to task G2. Assignments of resources are shown in darkened circles placed around a task, i.e., a circle (representing an assignment) around a filled in circle (representing a task). Also shown in FIG. 2C is total completion time for each option, which is always longer than the initial completion time of 28 days of project plan 220.

Although FIG. 2C shows that only six options for adjusting project plan 220, in fact, there are 24 possibilities for adjusting the simple project plan 220. But in large or complicated project plans, the number of ways in which the project plan can be adjusted in the face of resource constraints becomes so complex (thousands or millions of possibilities) that it becomes an NP-complete problem, which is a class of computational problems for which no efficient solution algorithm exists.

When time delays are introduced during project execution, the project plans of FIG. 2C are further affected. FIG. 2D shows the same plurality of options for adjusting the simple project plan 220 due to resource constraints of FIG. 2C. But FIG. 2D also shows the effects of time delays. Option 1, for example, shows that the tasks B4 and B2 have been delayed by 4 days, while the task G2 has been delayed by 1 day. Also shown in FIG. 2D is total completion time for each option, which is always longer than the initial completion time of 28 days of project plan 220.

Referring now to the drawing figures in which like reference designators refer to like elements, there is shown in FIG. 1 an illustration of a block diagram showing the network architecture of a system 100 and method for generating and maintaining a resource deployment map over a communications network in accordance with one embodiment. A prominent element of FIG. 1 is the server 102 associated with repository or database 104 and further communicatively coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality of the disclosed embodiments, namely, generating and maintaining a resource deployment map.

FIG. 1 includes computing devices 121, 141, which may be mobile computing devices such as smart phones, mobile phones, tablet computers, handheld computers, laptops, or the like. In another embodiment, computing devices 121, 141, are workstations, desktop computers, servers, laptops, all-in-one computers, or the like. In another embodiment, computing devices 121, 141, are AR or VR systems that may include display screens, headsets, heads up displays, helmet mounted display screens, tracking devices, tracking lighthouses or the like. Computing device 121 corresponds to a user 111 of the disclosed system for generating and maintaining a resource deployment map while computing device 141 corresponds to a user 131. Devices 102, 121, 141 may be communicatively coupled with network 106 in a wired or wireless fashion. Augmented reality (AR) adds digital elements to a live view often by using a camera on a computing device. Virtual reality (VR) is a complete or near complete immersion experience that replaces the physical world.

FIG. 1 further shows that server 102 includes a database or repository 104, which may be a relational database comprising a Structured Query Language (SQL) database stored in a SQL server. Devices 121, 141 may also each include their own database. The repository 104 serves data from a database, which is a repository for data used by server 102 and devices 121, 141 during the course of operation of the disclosed embodiments. Database 104 may be distributed over one or more nodes or locations that are connected via network 106.

The database 104 may include a user record for each user 111 or 131. A user record may include: contact/identifying information for the user (name, address, telephone number (s), email address, etc.), information pertaining to projects associated with the user, contact/identifying information for co-workers or managers of the user, information pertaining to resource deployment maps associated with the user, permission data associated with the user, login and password data for each user, etc. A user record may also include a unique identifier for each user, the current location of each user (based on location-based services from the user's mobile computer) and a description of past modifications made to resource deployment maps by each user. A user record may further include demographic data for each user, such as age, sex, income data, race, color, marital status, etc.

The database 104 may include a resource deployment map record for each project. A resource deployment map is a network of tasks that shows the intended progression of a project from start to finish and includes a set of tasks, wherein each task defines one or more actions that must be taken or performed for a project. A resource deployment map also includes dependencies between tasks of the set of tasks, a predefined period of time required for completing each task of the set of tasks, a set of resources, and assignments of the set of resources to the set of tasks. A resource deployment map may further comprise a data structure to capture execution level detailed tasks for every task. This data structure can be a list of items, an array, a linked list, a linear sequence of items, a set of workstreams (multiple linear sequences of items), or a network.

A resource deployment map may also include a timetable consisting of a list of times/dates at which tasks, events, or actions are intended to take place, or of a sequence of events in the chronological order in which such things are intended to take place. During the process of creating a resource deployment map, an algorithm decides how to order the tasks and how to commit resources between the tasks, while also considering priorities, hierarchies, dependencies, and the amount of work that has already been completed.

FIG. 1 shows an embodiment wherein networked computing devices 121, 141 interact with server 102 and repository 104 over the network 106. It should be noted that although FIG. 1 shows only the networked computers 121, 141 and 102, the system of the disclosed embodiments supports any number of networked computing devices connected via network 106. Further, server 102, and devices 121, 141 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 121, 141. Further, server 102 and its functionality, according to a preferred embodiment, can be realized in a centralized fashion in one computer system or in a distributed fashion wherein different elements are spread across several interconnected computer systems.

Figure 2E:
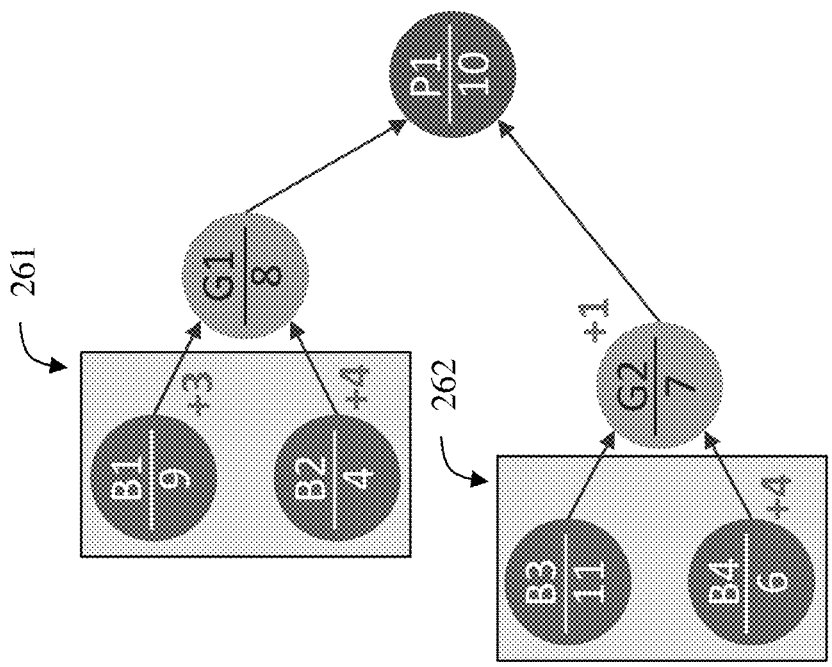
FIG. 2E is a block diagram showing both a prior art resource deployment map that has been affected by time delays and resource constraints, and the claimed method for modifying a resource deployment map that has been affected by time delays and resource constraints, in accordance with one embodiment.
Figure 2E:
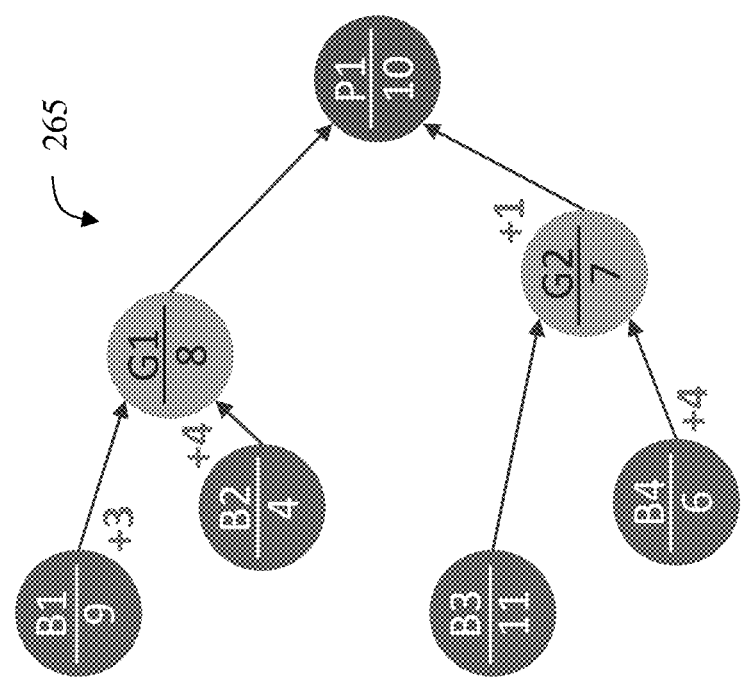
Figure 2F:
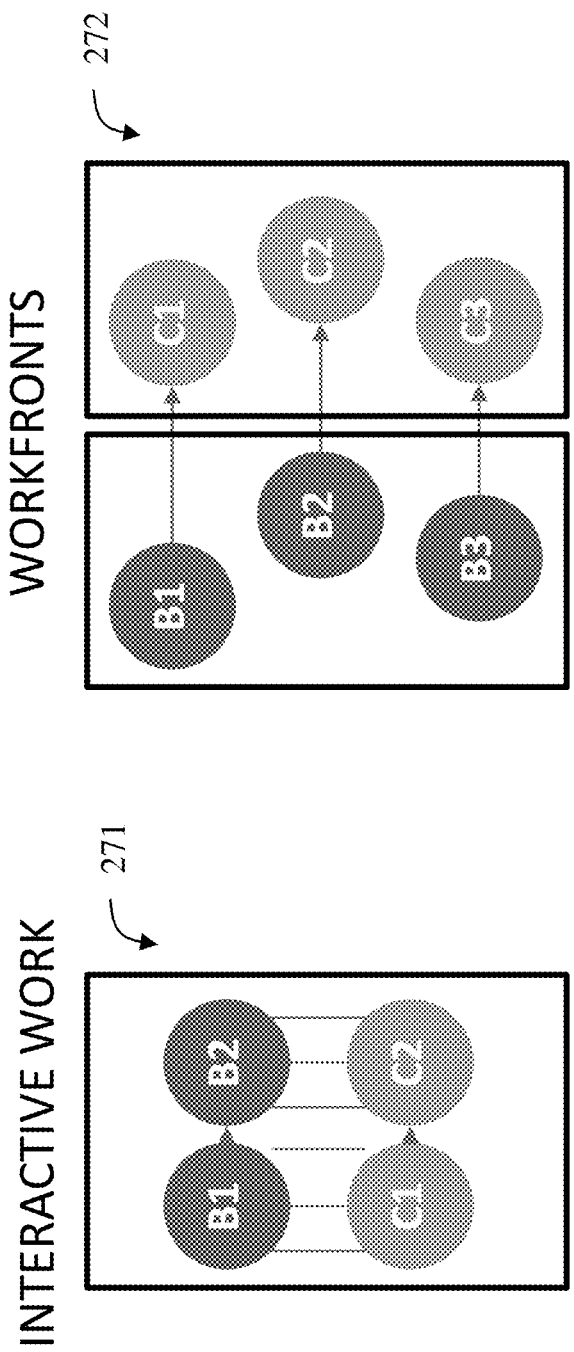
FIG. 2F is a block diagram showing integration points, in accordance with one embodiment.

The process of generating and maintaining a resource deployment map over a communications network will now be described with reference to FIGS. 2A through 3 below. FIGS. 2A and 3 depict the data flow and control flow of the process for generating and maintaining a resource deployment map over a communications network 106, according to one embodiment. FIG. 2E is a block diagram showing a set of tasks for a project used in the process for generating and maintaining a resource deployment map over a communications network, according to one embodiment. The process of the disclosed embodiments begins with optional step 302 (see flowchart 300), wherein the users 111 and/or 131 may enroll or register with server 102. In the course of enrolling or registering, the users may enter data 202 into their device by manually entering data into a mobile application via keypad, touchpad, or via voice. In the course of enrolling or registering, the users may enter any data that may be stored in a user record, as defined above. Also in the course of enrolling or registering, the server 102 may generate a user record for each registering user and store the user record in an attached database, such as database 104. Also, in optional step 302, a resource deployment map 201 may already be in place and stored in database 104.

Subsequently, in step 304, the server 102 generates an initial resource deployment map 201 based on a current set of resources and a current set of predefined periods of time necessary to complete each task of the resource deployment map. Then, in step 306, a user inputs project change information. Project change information is typically triggered when there is a changing circumstance or some other event, input by the users 111, 131 via data 204, that requires a change in the resource deployment map. Data 204 may encompass changes that have occurred during the course of a project, such as a change in availability of resources, time constraints, time delays in one or more tasks or other requirements. The project change information may include, for example, a modified set of resources, which are smaller or less than the initial set of resources on which the initial resource deployment map 201 was based. The project change information may also include, for example, a set of time delays on one or more tasks, thereby increasing the total project completion time, over and above the total completion time in the initial resource deployment map 201. The step of receiving project change information may further comprise receiving an HTTP request from a user 111 via the communications network 106.

The consequence of the project change information is that a new resource deployment map must be created that reassigns resources such that said new resource deployment map is viewable by the users 111, 131 on their devices and may be used to manage the project at hand.

In step 308, the server 102 identifies integration points that comprise one or more tasks that come together at a key point in the project plan or resource deployment map. In one embodiment, an integration point comprises a first set of tasks that are required to be completed before a next task is able to be completed, wherein said next task is sequentially dependent on the first set of tasks. FIG. 2E, for example, shows integration point 261, which comprises task B1 and task B2, since tasks B1 and B2 must be completed before task G1 is completed, wherein task G1 is sequentially dependent on tasks B1 and B2. Task G1 is sequentially dependent on tasks B1 and B2 because task G1 cannot be completed before tasks B1 and B2, and task G1 can only be completed if and only if (i.e., sequentially after) tasks B1 and B2 have been completed. FIG. 2E, for example, also shows integration point 262, which comprises task B3 and task B4, since tasks B3 and B4 must be completed before task G2 is completed, wherein task G2 is sequentially dependent on tasks B3 and B4. Integration point 262 is an obvious integration point because it is clear that tasks B3 and B4 must come together and integrate before the subsequent task is completed.

In another embodiment, an integration point comprises a first set of tasks and a second set of tasks that must be completed at the same time before a next task is able to be completed. FIG. 2F, for example, shows integration point 271, which comprises a first set of tasks B1 and B2, and a second set of tasks C1, C2, wherein the first and second set of tasks must be completed before a subsequent task (not shown) is completed, wherein the subsequent may be sequentially dependent on the first and second set of tasks. Integration point 271 arises in situations where a first set of tasks benefits from being completed at the same time as a second set of tasks, such as a team of plumbers working at the same time as a team of electricians, wherein both teams must work and interact together (i.e., interactive work) to make sure that there are no collisions or other conflicts between the two set of tasks being completed. Note that in FIG. 2F, circles B1, B2, B3 are blue, and circles C1, C2, C3 are green.

In another embodiment, an integration point comprises a first set of tasks that are required to be completed before a second set of tasks are able to be completed, wherein the second set of tasks are sequentially dependent on the first set of tasks. FIG. 2F, for example, shows integration point 272, which comprises a first set of tasks B1, B2, B3 (a workfront) that must be completed before a second set of tasks C1, C2, C3 is completed, wherein the second set of tasks is sequentially dependent on the first set of tasks. The second set of tasks is sequentially dependent on the first set of tasks because the second set cannot be completed before the first set, and the second set can only be completed if and only if (i.e., sequentially after) first set have been completed. Integration point 272 is an obvious integration point because it is clear that tasks B1-B3 must come together and integrate before the subsequent set of tasks C1-C3 is completed.

In the next step 310, server 102 reassigns the modified set of resources as follows: Step 1: assign all resources, of the modified set of resources, necessary for completion of a first integration point of the one or more integration points; Step 2: assign all remaining resources, of the modified set of resources, necessary for completion of a next integration point of the one or more integration points; Step 3: repeat step 2 until all resources of the modified set of resources are assigned. FIG. 2B shows a situation where the simple project plan 225 with time delays has been constrained by limiting resources to two blue resources and one green resource. By applying steps 308, 310 to the simple project plan 225, in light of the project change information above, one can see that integration points 261 and 262 have been defined (see FIG. 2E), which leaves only two options for adjusting the project plan due to the project change information, thereby eliminating the NP-complete problem described above. The first option would be to allocate the two blue resources to integration point 261 (see FIG. 2E) and the single green resource to task G1, after completion of which the same resources are assigned to integration point 262 and task G2. The total completion time for the first option is 40 days. The second option would be to allocate the two blue resources to integration point 262 and the single green resource to task G2, after completion of which the same resources are assigned to integration point 261 and task G1. The total completion time for the second option is 41 days. It can be seen that the total completion time for both options as a result of step 310 (as shown on the right of FIG. 2E), is shorter than the majority of the options available in FIG. 2D above.

It should be noted that it is assumed that after the resources assigned to a first integration point are used and the first integration point is completed, then said resources should be assigned to the next integration point, and so on and so forth. Therefore, in option 1 of FIG. 2E, after completion of integration point 261, the two blue resources are assigned to integration point 262. And after completion of task G1, the green resource is assigned to task G2.

FIG. 2E also shows a prior art method (plan 265) of scattering resources when project change information is input, as opposed to concentrating resources at integration points, as defined in step 310 above. The prior art method (plan 265) shows that one blue resource is assigned to task B1, while the second blue resource is assigned to step B3. After tasks B1 and B3 are completed, the two blue resources are assigned to tasks B2 and B4. After task B2 is completed, then the green resource is assigned to G1. After the completion of task G1, the green resource is assigned to task G2. The total completion time for prior art method 265 is 46 days. It can be seen that the total completion time for prior art method (plan 265) of FIG. 2E (which does not use step 310), is longer and more inefficient than the options available using step 310 above (as shown on the right of FIG. 2E).

In step 312, a new resource deployment map 206 is generated based on the project change information and the new assignment of resources defined in step 310 above. Also in step 312, the server 102 may publish the revised resource deployment map 206 for view by the users via the communications network 106. The users 111, 131 may view resource deployment map 206 on their devices and may be used to manage the project at hand. Subsequently, control flows back to step 306, where, at a later time, new project change information is submitted, and the resource deployment map is modified once more. In this way, the claimed embodiments can be used to continually maintain resource deployment map as project change information is presented during project execution.

Figure 2G:
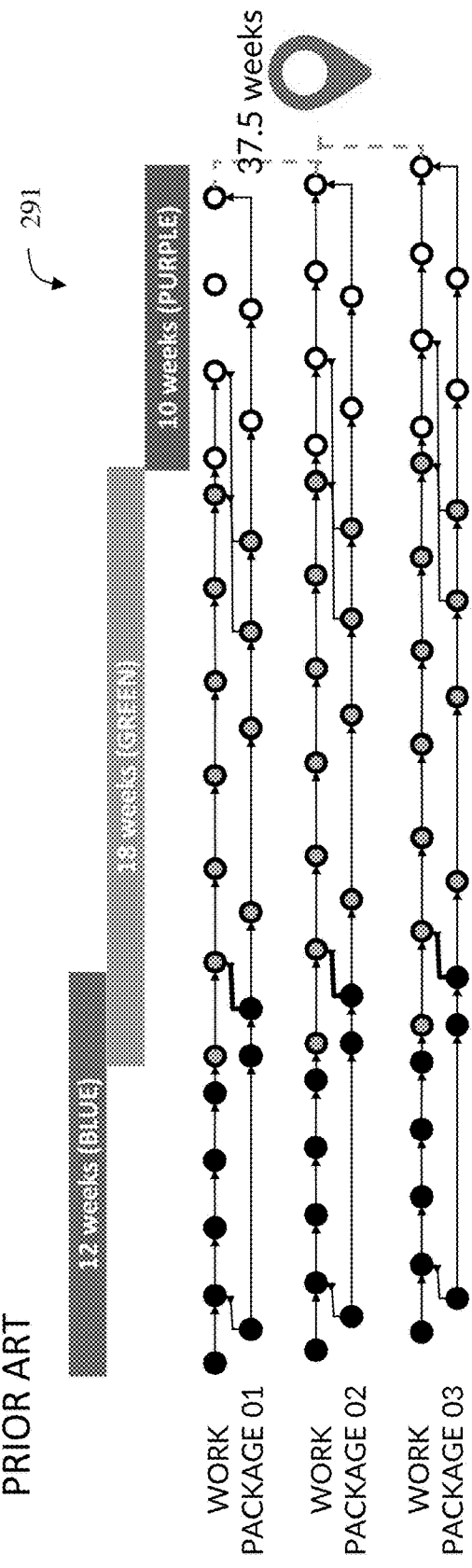
FIG. 2G is a block diagram showing both a prior art resource deployment map that has been affected by time delays and resource constraints, and the claimed method for modifying a resource deployment map that has been affected by time delays and resource constraints, in accordance with one embodiment.
Figure 2G:
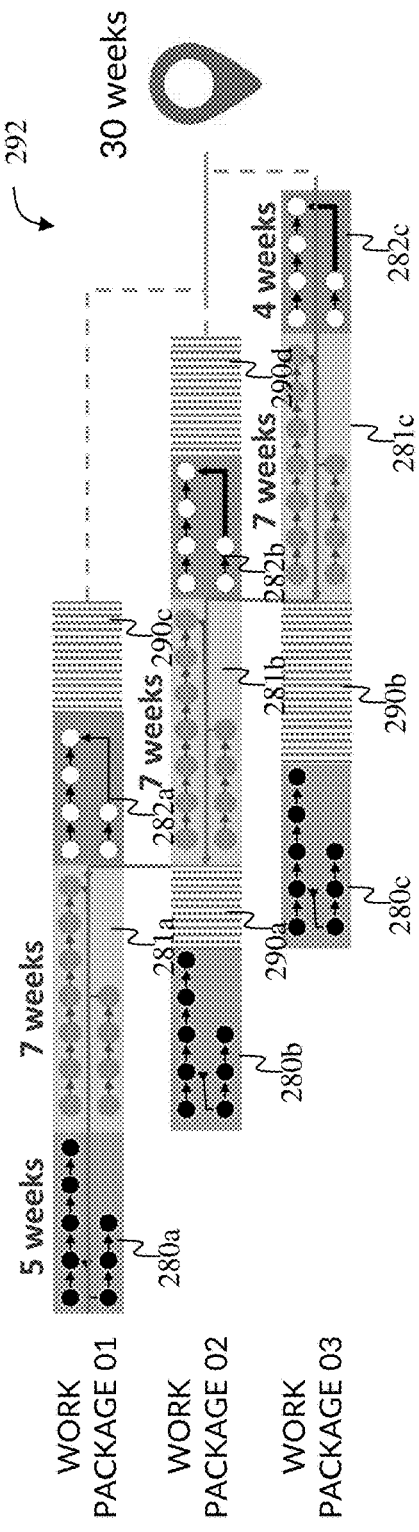
Figure 3:
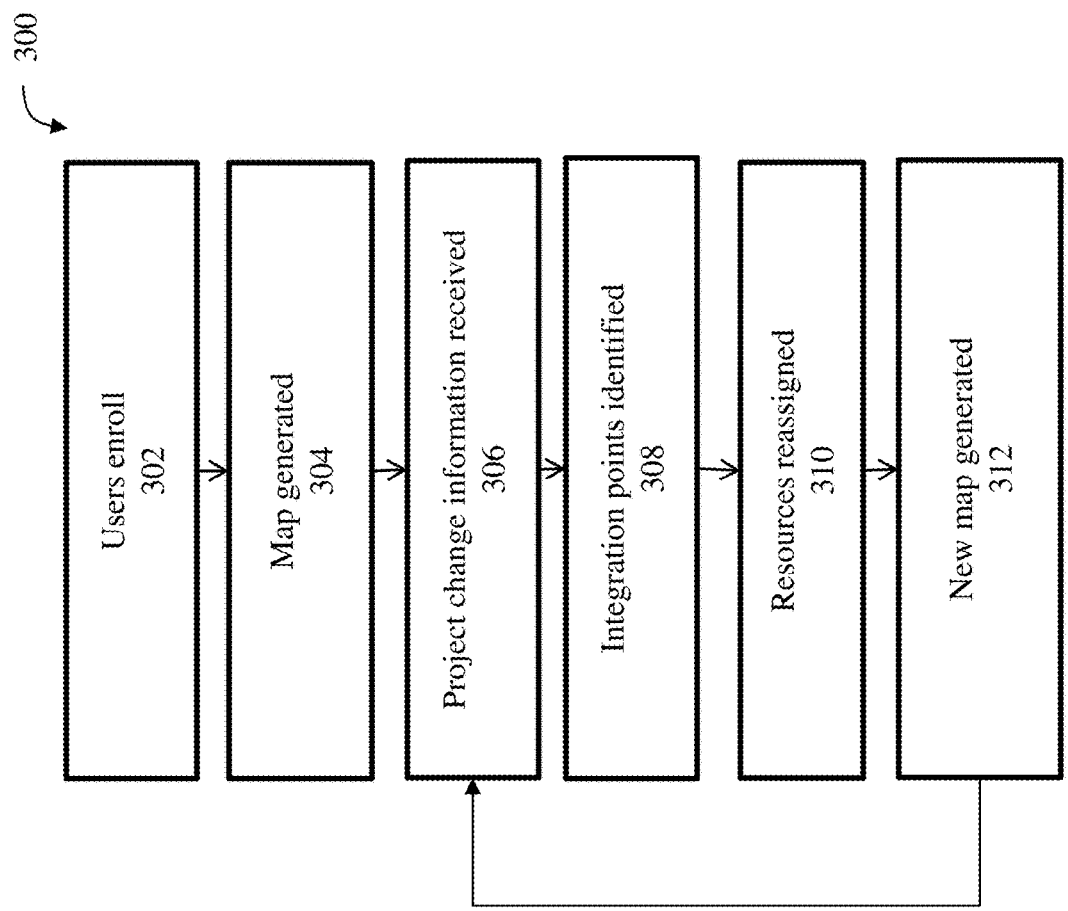
FIG. 3 is a flow chart depicting the general control flow of a process for generating and maintaining a resource deployment map over a communications network, according to one embodiment.

FIG. 2G is a block diagram showing both a prior art project map 291 that has been affected by time delays and resource constraints, and the claimed method for modifying a resource deployment map 292 that has been affected by time delays and resource constraints, in accordance with one embodiment. In 291 and 292, each task is represented as a circle wherein the black circles require blue resources, the grey circles require green resources, and the white circles require purple resources. In 291 and 292, each row is a single work package, which refers to a set of tasks that are categorized together because they represent a single item, such as the construction of a structure, or the completion of programming of software.

By applying steps 308, 310 to the more complex resource deployment map 292, in light of project change information including time delays and resource constraints, one can see that integration points 280a, 280b, 280c (blue resources), 281a, 281b, 281c (green resources), 282a, 282b, 282c (purple resources) have been defined, which reduces the options for adjusting the resource deployment map due to the project change information, thereby eliminating the NP-complete problem described above. One can see that the resource deployment map calls for the blue resources to be assigned integration point 280a, after which they are assigned to point 280b and then to 280c. The same applies to the green resources (281a, then 281b and then 281c), and the purple resources (282a, then 282b and then 282c). The total completion time is 30 weeks. It should be noted that one of the benefits of using the claimed method to adjust the resource deployment map 292, is that buffers are automatically created in certain places. For example, a buffer 290c is automatically created at the end of work package #1, a buffer 290a is automatically created at the end of integration point 280b, a buffer 290d is automatically created at the end of integration point 282b, and a buffer 290b is automatically created at the end of integration point 280c. Therefore, one of the benefits of using the claimed method is the automatic creation of buffers, which are well known to reduce total completion time of projects and increase the overall efficiency of the project.

FIG. 2G also shows a prior art project map 291 that scatters resources when project change information is input, as opposed to concentrating resources at integration points, as defined in resource deployment map 292 above. Prior art project map 291 shows that resources have been scattered throughout the resource deployment map, resulting in more time delays being realized. The total completion time is 37.5 days. It can be seen that the total completion time for the prior art project map 291 (which does not use step 310), is longer and more inefficient than the claimed resource deployment map 292 above.

Figure 4:
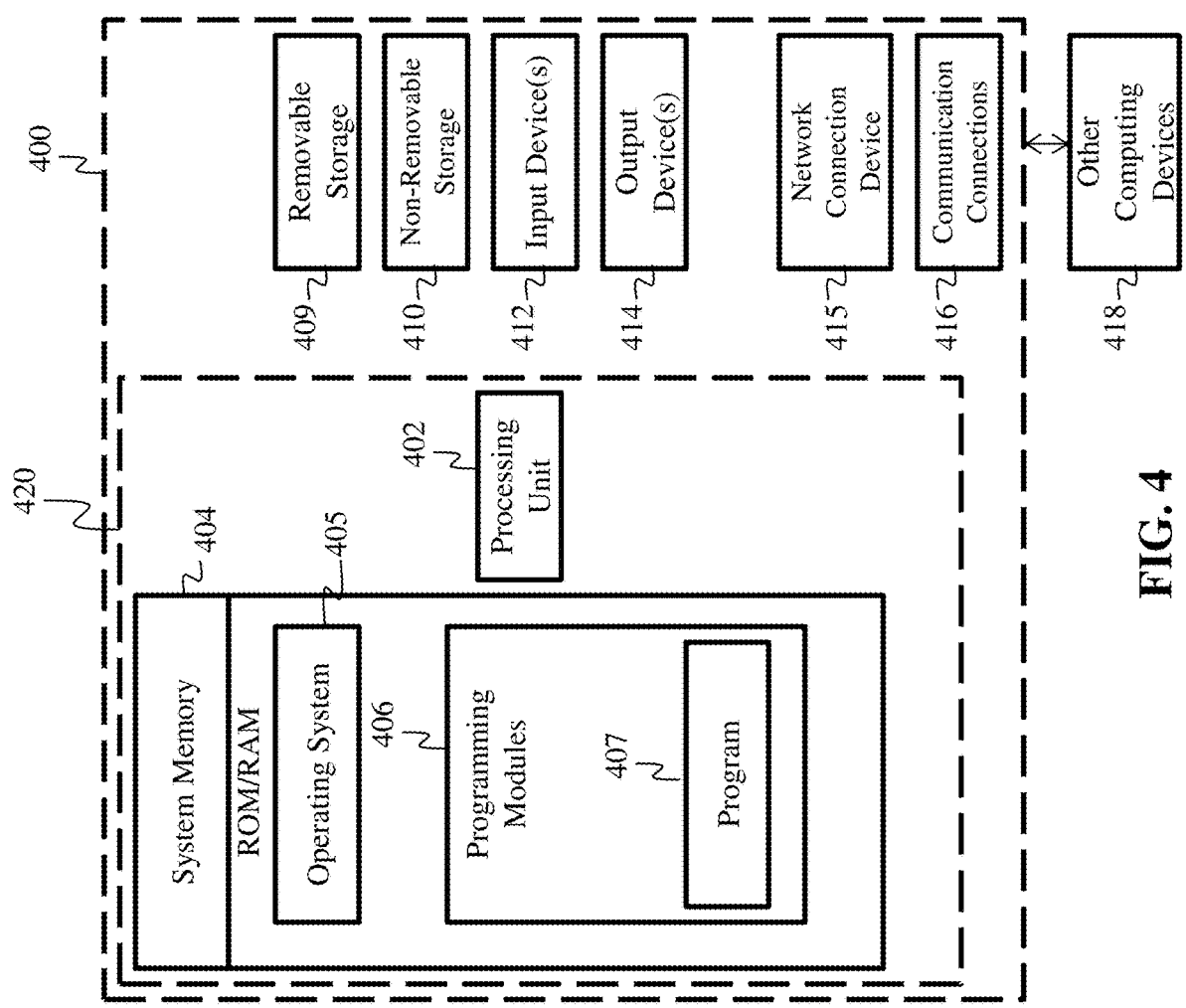
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 121, 141, 102 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and process 300, as described above. Process 300 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of 121, 141, 102. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the process 300 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for generating and maintaining a resource deployment map for a project over a communications network, the system comprising:
a database communicably connected to the communications network, the database configured for storing the resource deployment map, the resource deployment map including:
a set of tasks;
dependencies between tasks of the set of tasks;
a predefined period of time required for completing each task of the set of tasks;
a set of resources, wherein a resource comprises an asset including labor and materials;
assignments of the set of resources to the set of tasks;
a web server communicably connected to the communications network, the web server configured for:
a) receiving, via the communications network, project change information including a modified set of resources, and time delays in the predefined periods of time required for completing each task of the set of tasks;
b) identifying one or more integration points in the resource deployment map, wherein an integration point comprises one or more tasks that must be completed before a next task is able to be completed, wherein said next task includes a dependency on the one or more tasks;
c) assigning the modified set of resources to the set of tasks as follows:
i) assign all resources, of the modified set of resources, necessary for completion of a first integration point of the one or more integration points;
ii) assign all remaining resources, of the modified set of resources, necessary for completion of a next integration point of the one or more integration points;
iii) repeat step ii) until all resources of the modified set of resources are assigned;
d) generating a revised resource deployment map based on the modified set of resources, and time delays.

2. The system of claim 1, wherein each task of the set of tasks further comprises an identification of one or more resources required for completing said task.

3. The system of claim 2, wherein the step of receiving project change information further comprises receiving an HTTP request from a user via the communications network.

4. The system of claim 3, wherein an integration point further comprises a first set of tasks and a second set of tasks, of the set of tasks, that must be completed at the same time before a next task, of the set of tasks, is able to be completed.

5. The system of claim 3, wherein an integration point further comprises a first set of tasks, of the set of tasks, that are required to be completed before a second set of tasks, of the set of tasks, are able to be completed, wherein the second set of tasks are sequentially dependent on the first set of tasks.

6. The system of claim 3, further comprising the step of publishing, by the web server, the revised resource deployment map, via the communications network, for viewing by the user.

7. A method for generating and maintaining a resource deployment map for a project over a communications network, the method comprising:
storing the resource deployment map in a database communicably connected to the communications network, the resource deployment map including:
a set of tasks;
dependencies between tasks of the set of tasks;
a predefined period of time required for completing each task of the set of tasks;
a set of resources, wherein a resource comprises an asset including labor and materials;
assignments of the set of resources to the set of tasks;
providing a web server communicably connected to the communications network, the web server configured for:
a) receiving, via the communications network, project change information including a modified set of resources, and time delays in the predefined periods of time required for completing each task of the set of tasks;
b) identifying one or more integration points in the resource deployment map, wherein an integration point comprises one or more tasks that must be completed before a next task is able to be completed, wherein said next task includes a dependency on the one or more tasks;
c) assigning the modified set of resources to the set of tasks as follows:
i) assign all resources, of the modified set of resources, necessary for completion of a first integration point of the one or more integration points;
ii) assign all remaining resources, of the modified set of resources, necessary for completion of a next integration point of the one or more integration points;
iii) repeat step ii) until all resources of the modified set of resources are assigned;
d) generating a revised resource deployment map based on the modified set of resources, and time delays.

8. The method of claim 7, wherein each task of the set of tasks further comprises an identification of one or more resources required for completing said task.

9. The method of claim 8, wherein the step of receiving project change information further comprises receiving an HTTP request from a user via the communications network.

10. The method of claim 9, wherein an integration point further comprises a first set of tasks and a second set of tasks, of the set of tasks, that must be completed at the same time before a next task, of the set of tasks, is able to be completed.

11. The method of claim 9, wherein an integration point further comprises a first set of tasks, of the set of tasks, that are required to be completed before a second set of tasks, of the set of tasks, are able to be completed, wherein the second set of tasks are sequentially dependent on the first set of tasks.

12. The method of claim 9, further comprising the step of publishing, by the web server, the revised resource deployment map, via the communications network, for viewing by the user.

13. A non-transitory computer readable medium with instructions stored thereon, that when executed by a processor, performs the steps comprising:

provding a database communicably connected to a communications network, the database configured for storing a resource deployment map for a project, the resource deployment map including:

a set of tasks;

dependencies between tasks of the set of tasks;

a predefined period of time required for completing each task of the set of tasks;

a set of resources, wherein a resource comprises an asset including labor and materials;

assignments of the set of resources to the set of tasks;

providing a web server communicably connected to the communications network, the web server configured for:

a) receiving, via the communications network, project change information including a modified set of resources, and time delays in the predefined periods of time required for completing each task of the set of tasks;

b) identifying one or more integration points in the resource deployment map, wherein an integration point comprises one or more tasks that must be completed before a next task is able to be completed, wherein said next task includes a dependency on the one or more tasks;

c) assigning the modified set of resources to the set of tasks as follows:

i) assign all resources, of the modified set of resources, necessary for completion of a first integration point of the one or more integration points;

ii) assign all remaining resources, of the modified set of resources, necessary for completion of a next integration point of the one or more integration points;

iii) repeat step ii) until all resources of the modified set of resources are assigned;

d) generating a revised resource deployment map based on the modified set of resources, and time delays.

14. The non-transitory computer readable medium of claim 13, wherein each task of the set of tasks further comprises an identification of one or more resources required for completing said task.

15. The non-transitory computer readable medium of claim 14, wherein the step of receiving project change information further comprises receiving an HTTP request from a user via the communications network.

16. The non-transitory computer readable medium of claim 15, wherein an integration point further comprises a first set of tasks and a second set of tasks, of the set of tasks, that must be completed at the same time before a next task, of the set of tasks, is able to be completed.

17. The non-transitory computer readable medium of claim 15, wherein an integration point further comprises a first set of tasks, of the set of tasks, that are required to be completed before a second set of tasks, of the set of tasks, are able to be completed, wherein the second set of tasks are sequentially dependent on the first set of tasks.

* * * * *